Patented Jan. 21, 1930

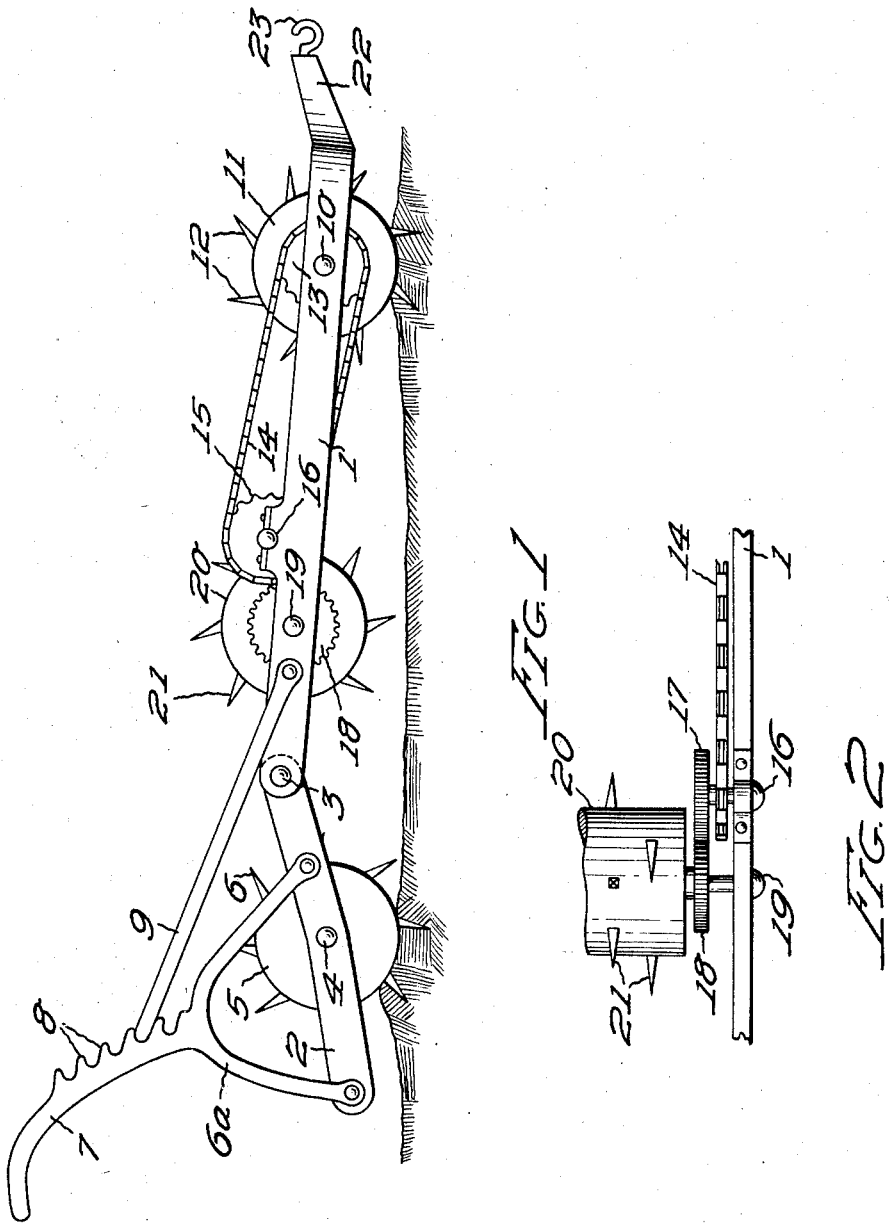

1,744,312

UNITED STATES PATENT OFFICE

ERNST RAGNAR JANSSON, OF PROCTOR, VERMONT

HARROW

Application filed November 7, 1927. Serial No. 231,632.

This invention relates to improvements in harrows and more particularly to roller harrows. Its principal object is to provide a harrow of this type that is very efficient in operation and durable and that is so construted that it can be adapted to use in soil of any kind.

With the foregoing and other objects in view the invention consists in the combination and arrangement of parts to be hereinafter fully described, particularly pointed out in the appended claims and illustrated in the accompanying drawing which forms a part of this application and in which—

Fig. 1 is a side view of the harrow showing its application.

Fig. 2 is a fragmentary plan view of Fig. 1.

Like reference characters denote corresponding parts in both views.

The present invention comprises a harrow frame formed in two sections hinged together, each section being supported upon a roller, the sections being of unequal length and the longer section being provided with an auxiliary roller near its hinged end which roller is maintained in a raised position clear of the ground, the weight of the raised roller tending to depress the hinged end of the longer frame section but this movement is prevented by a U-shaped member the ends of which are connected to the sides of the longer frame section, the base of this U-shaped member being meshed with the teeth of racks carried by a framework arranged upon the shorter frame section. Adjustment of the U-shaped member over the frame rack will determine the height of the raised roller above the ground line.

The harrow comprises a long frame section 1 and a short frame section 2, said sections being connected together by the hinge 3. The short frame section is supported upon the shaft 4 that connects its sides and extends longitudinally through the roller 5 provided with the teeth or blade 6. A framework 6ª is supported upon the frame section 2 and comprises upon each side a rearwardly curved rack 7 formed with teeth 8 any of which may be engaged by the base of the U-shaped bar 9 the ends of which are pivotally connected to the frame section 1 adjacent its hinged end.

The frame section 1 is supported upon the shaft 10 that connects its sides and extends longitudinally through the roller 11 provided with the teeth 12. The rollers 12 and 5 are similar and the teeth of each are adapted to break up the soil over which the machine travels. A sprocket wheel 13 fast upon the said shaft 10 is connected by the sprocket chain 14 to another sprocket wheel 15 fast to a stub shaft 16 journaled in a bearing upon the frame section 1. A gear wheel 17 fast upon the stub shaft 16 is in mesh with another gear wheel 18 fast upon the shaft 19 that connects the sides of the frame section 1 near its hinged end and carries the roller 20 provided with teeth 21, said roller and teeth being raised or supported by the frame section 1 above the ground line. The roller 20 is caused to rotate by the gears 17, 18 and sprocket wheels 15, 13 connected by sprocket chain 14, this roller driving mechanism being arranged upon both sides of the frame section 1.

At the forward end 22 of the frame section 1 a draft hook 23 is provided by means of which the draft animals or a tractor may be connected to the harrow to move it over the ground. In use the teeth 11 of the roller 12 pulverize the earth as they pass over it and any clods or large pieces of earth thrown rearwardly of the frame by the teeth 12 will be engaged and pulverized by the teeth 21 of roller 20, this roller serving as an auxiliary also for engagement with such clods as may be thrown up from the earth and left in the partly harrowed ground by the roller 11 and teeth 12, the final roller 5 with teeth 6 passing finally over the ground and serving to pulverize it still more thoroughly.

The relative positions of the bar 9 and rack 7 determines the inclination of the frame section 1 with respect to the frame section 2 and the height of the roller 20 above the ground line. To change the relative positions of the members 9, 7 the hinged ends of the frame sections may be jacked up to free the bar 9 from the rack teeth and when the desired relative position is effected the frame is released from the jacks.

What is claimed is:—

1. In a harrow, a long frame section, a short frame section, hinge connection between said sections, toothed rollers supporting said frame sections, a toothed roller carried by said long frame section at its hinged end, a rack carried by the short frame section, a bar pivotally carried by the long frame section for adjustable engagement with said rack whereby the hinged ends of said frame sections are retained at a relatively high position above the ground, and power transmission between one of the first named toothed rollers and the roller carried at the hinged end of the long frame section.

2. In a harrow, a long frame section, a short frame section, hinge connection between said sections, a toothed roller carried by said long frame section clear of the ground, a rack carried by said short frame section, a U-shaped bar pivotally carried by said long frame section for cooperation with said rack whereby the hinged ends of said frame sections are maintained at a relatively high position above the ground, and power transmission mechanism connecting the toothed rollers of said long frame section.

In testimony that I claim the foregoing as my own I have hereto affixed my signature.

ERNST RAGNAR JANSSON.